(12) United States Patent
Chen et al.

(10) Patent No.: US 8,749,974 B2
(45) Date of Patent: Jun. 10, 2014

(54) ELECTRONIC DEVICE ENCLOSURE

(75) Inventors: Xiao-Run Chen, Shenzhen (CN);
Zhi-Ping Wu, Shenzhen (CN);
Chih-Hang Chao, Tu-Cheng (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 320 days.

(21) Appl. No.: 13/151,496

(22) Filed: Jun. 2, 2011

(65) Prior Publication Data
US 2012/0097562 A1    Apr. 26, 2012

(30) Foreign Application Priority Data
Oct. 25, 2010  (CN) .......................... 2010 1 0517894

(51) Int. Cl.
*B65D 85/00* (2006.01)

(52) U.S. Cl.
USPC ..................... 361/679.6; 361/679.02; 174/67; 174/563

(58) Field of Classification Search
USPC ............... 174/50, 520, 67, 66, 559, 560–563; 361/679.01, 679.02, 679.6, 796, 801, 361/802, 752, 732, 747, 759; 220/4.02; 312/223.2, 263, 223.3
See application file for complete search history.

(56) References Cited

U.S. PATENT DOCUMENTS

| | | | | |
|---|---|---|---|---|
| 4,560,079 A | * | 12/1985 | Eddleston et al. | 220/4.02 |
| 5,593,219 A | * | 1/1997 | Ho | 312/263 |
| 5,931,550 A | * | 8/1999 | Chen | 312/244 |
| 7,404,610 B2 | * | 7/2008 | Smith et al. | 312/223.2 |
| 8,434,832 B2 | * | 5/2013 | Calloway et al. | 312/223.2 |
| 2012/0002384 A1 | * | 1/2012 | Tiso et al. | 361/752 |

\* cited by examiner

*Primary Examiner* — Timothy Thompson
*Assistant Examiner* — Amol Patel
(74) *Attorney, Agent, or Firm* — Novak Druce Connolly Bove + Quigg LLP

(57) ABSTRACT

An electronic device enclosure includes a chassis and an operating member. The chassis includes a front plate and a top plate connected to the front plate. A clipping hole is defined in the front plate. The operating member includes a positioning portion and a securing piece. The positioning portion is received so it can be slid in the clipping hole, and the securing piece is attached to the front plate.

15 Claims, 5 Drawing Sheets

ELECTRONIC DEVICE ENCLOSURE

BACKGROUND

1. Technical Field

The present disclosure relates to an electronic device enclosure with an operating member.

2. Description of Related Art

Electronic device enclosures, such as a computer case, a server chassis, are usually moved when there is a need to be maintained or transported. However, the electronic device enclosures are cuboid and that can be inconvenient to move.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
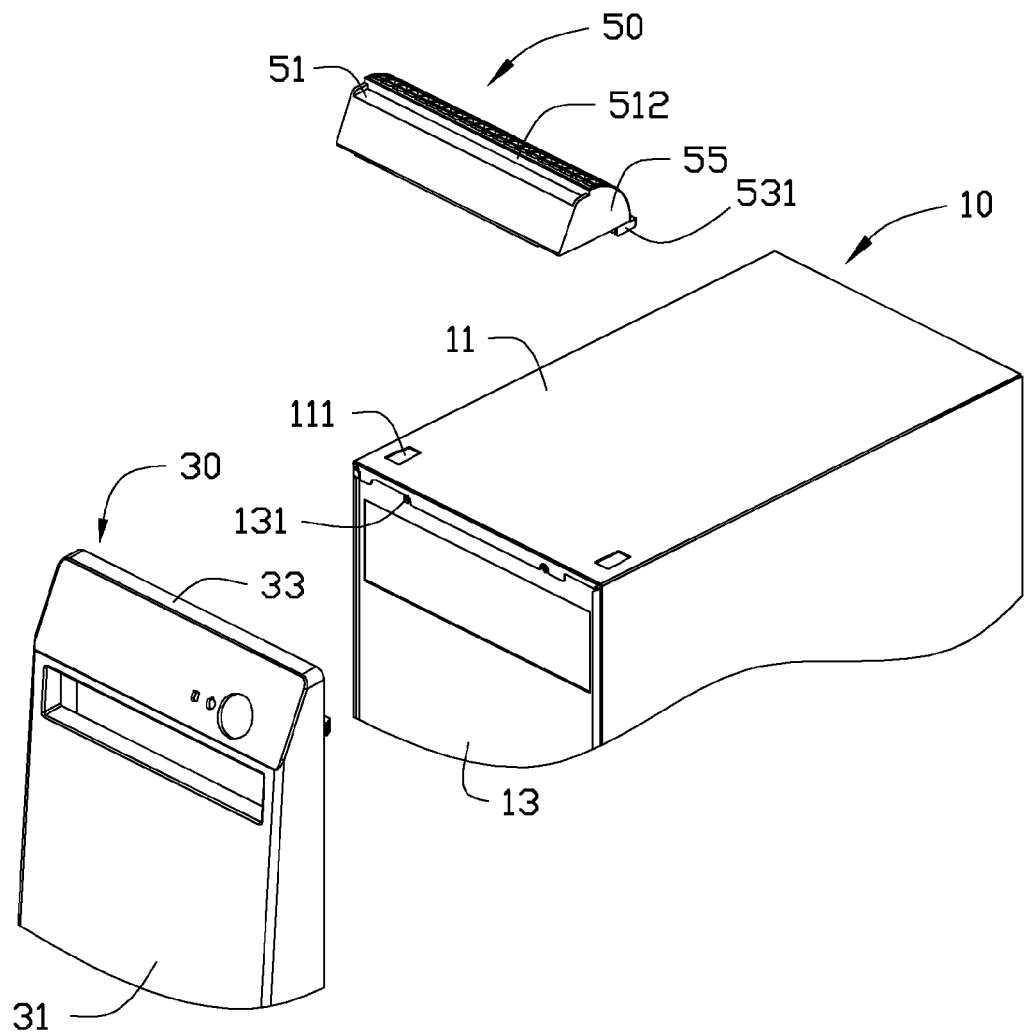
FIG. 1 is an exploded, cutaway view of an electronic device enclosure in accordance with an embodiment.

Referring to FIG. 1, an electronic device enclosure in accordance with an embodiment includes a chassis 10, a decorating plate 30, and an operating member 50. The chassis 10 can have any geometric shape, configuration, or orientation suitable for housing an electronic device therein. For simplicity and as an aid to description, the chassis 10 configured as a cuboid (only a part shown in FIG. 1) will be described herein, although other equally effective geometric shapes and configurations may exist in other embodiments.

The chassis 10 includes a top plate 11 and a front plate 13 connected to the top plate 11. Two clipping holes 111, adjacent to the front plate 13, are defined at two corners of the top plate 11. Two mounting holes 131, adjacent to the top plate 11, are defined in the front plate 13. In one embodiment, the top plate 11 is substantially perpendicular to the front plate 13.

The decorating plate 30 includes a main body 31 and a flange 33 connected to a top edge of the main body 31.

Figure 2:
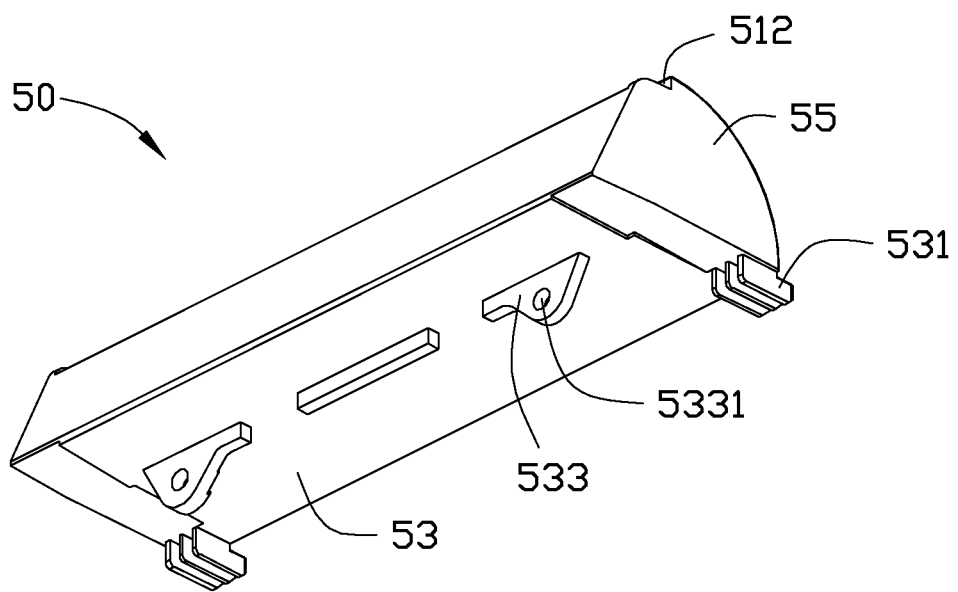
FIG. 2 is an isometric view of an operating member of the electronic device enclosure in accordance with an embodiment.
Figure 3:
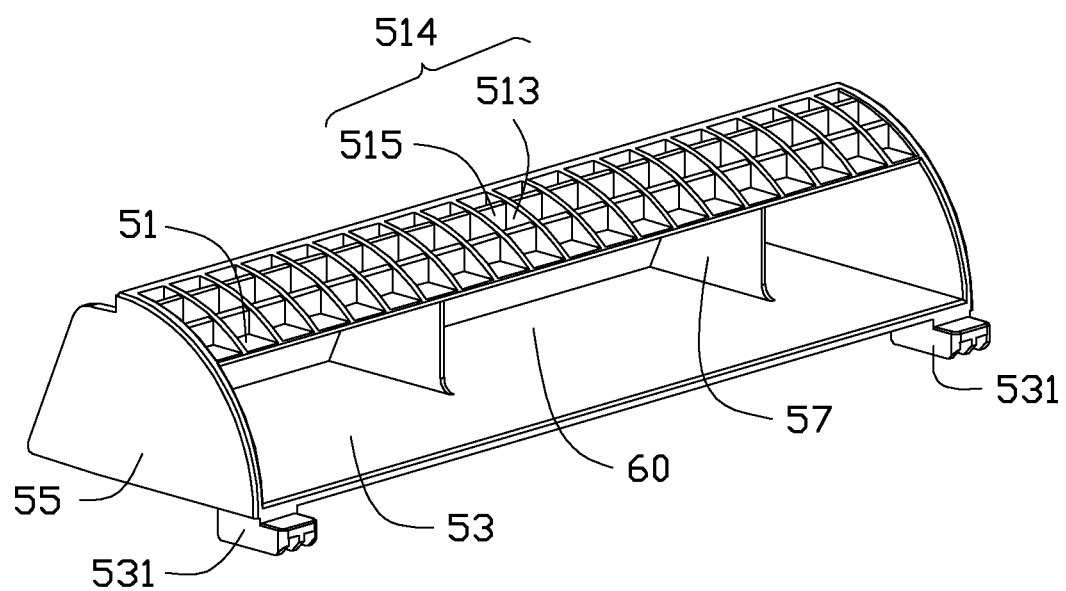
FIG. 3 is similar to FIG. 2, but viewed in a different aspect.

Referring to FIGS. 2-3, the operating member 50 includes a top panel 51, a bottom panel 53, and two side panels 55 connected to the top panel 51 and the bottom panel 53. Two supporting panels 57 are located between the two side panels 55, and connected to the top panel 51 and the bottom panel 53. The supporting panels 57 strengthen the configuration of the operating member 50. The top panel 51 and the bottom plane 53 cooperatively define a space 60. A handle or other structures can hook the operating member 50 by engaging in the space 60. In one embodiment, an edge of each side panel 55 is an arc, and the two supporting panels 57 are substantially parallel to the side panel 55 and perpendicular to the bottom panel 53.

A connecting flange 512 and a strengthening structure 514 are located on the top panel 51. The strengthening structure 514 is connected to the connecting flange 515 and includes a plurality of first ribs 513 and two second ribs 515 traversing the plurality of first ribs 513. With the plurality of first ribs 513 and the two second ribs 515, the configuration of the top panel 51 can be strengthened. In one embodiment, each first rib 513 is arc shaped. The first ribs 513 are substantially parallel to the side panel 55 and are perpendicular to each second rib 515.

A pair of positioning portions 531 is located at two corners of the bottom panel 53, and each positioning portion 531 includes three positioning tabs arranged in a row. Two securing pieces 533, each with a securing hole 5331, extend from an undersurface of the bottom panel 53. The securing hole 5331 corresponds to the mounting hole 131. In one embodiment, each securing piece 533 is substantially perpendicular to the bottom panel 53, and the securing pieces 533 and the connecting flange 512 are located in a plane.

Figure 4:
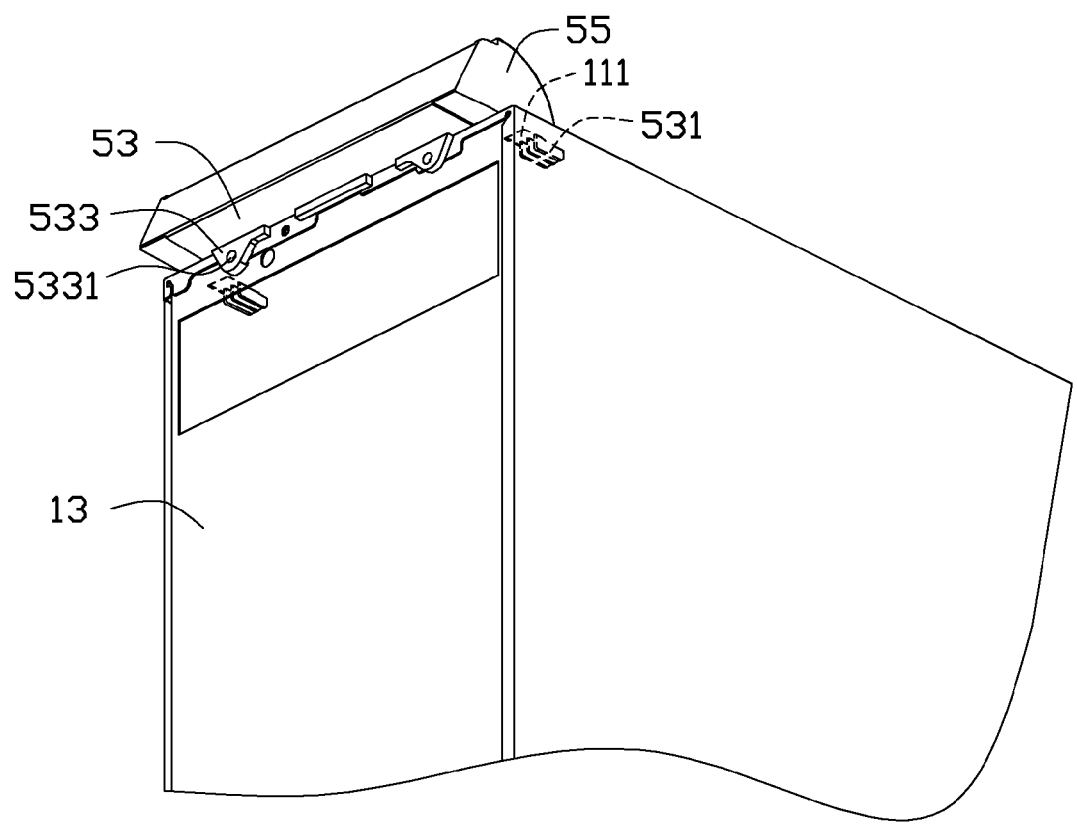
FIG. 4 is an assembled view of FIG. 1, but without a decorating plate of the electronic device enclosure.
Figure 5:
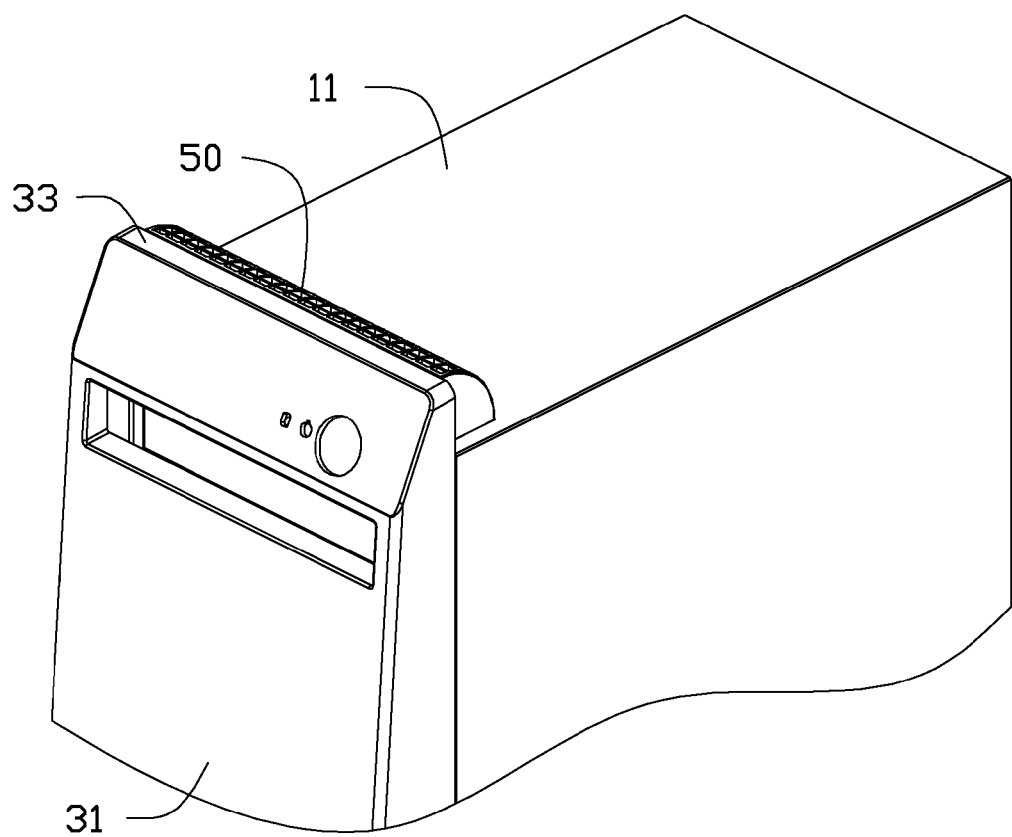
FIG. 5 is an assembled view of FIG. 1.

Referring to FIGS. 4-5, in assembly, the bottom panel 53 abuts the top plate 11. The two positioning portions 531 are inserted into the two clipping holes 111, and each positioning portion 531 is slidably positioned in a first end of each clipping hole 111. Initially, the securing pieces 533 are away from the front plate 13. In one embodiment, the first end is near the front plate 13. The operating member 50 is operated so the positioning portion 531 can move to a second opposite end of each clipping hole 111, until the securing pieces 533 abut the front plate 13. The securing hole 5331 of each securing piece 533 is aligned with each mounting hole 131 of the front plate 13. Two fixing members (not shown), such as screws, are received in the securing holes 533 and the mounting holes 131, to mount the securing piece 533 to the front plate 13.

The decorating plate 30 is mounted to the front plate 131 by known means, such as by screws or jointing. The flange 33 of the decorating plate 30 is adhered to the top panel 51 of the operating member 50. The top panel 51 is operated, and the chassis 10 and the decorating plate 30 are moved by the top panel 11.

In disassembly, the decorating plate 30 is removed from the front plate 131. The two fixing members are released, and the securing piece 533 is disengaged from the front plate 13. The operating member 50 is moved, so the positioning portions 531 can be slid to the first end of the clipping holes 111 via the second end. The positioning portions 531 are removed from the clipping holes 111, and the operating member 50 is thereby disengaged from the top panel 11.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   a chassis comprising a front plate, a top plate connected to the front plate, and a clipping hole defined in the top plate; and
   an operating member comprising a bottom panel, a top panel, a positioning portion, and a securing piece substantially perpendicular to the bottom panel, the top panel is substantially parallel to the bottom panel; a space is defined between the top panel and the bottom panel; a plurality of supporting panels are located in the space and extends substantially perpendicularly from the bottom panel; and the plurality of supporting panels are substantially parallel to each other and configured for strengthening the configuration of the operating member, wherein the positioning portion is slidably received in the clipping hole, and the securing piece is attached to the front plate.

2. The electronic device enclosure of claim 1, further comprising a decorating plate attached to the front plate, wherein the decorating plate comprises a flange, the top panel comprises a connecting flange, and the flange is attached to the connecting flange.

3. The electronic device enclosure of claim 2, wherein the top panel further comprises a strengthening structure configured for strengthening the configuration of the top panel.

4. The electronic device enclosure of claim 3, wherein the strengthening structure comprises a plurality of first ribs and a second rib, the second rib traversing the plurality of first ribs.

5. The electronic device enclosure of claim 4, wherein each first rib is arc shaped.

6. The electronic device enclosure of claim 4, wherein the second rib is substantially perpendicular to the plurality of first ribs.

7. The electronic device enclosure of claim 4, wherein the operating member further comprises a side panel substantially parallel to the plurality of first ribs.

8. An electronic device enclosure comprising:
a chassis comprising a front plate, a top plate connected to the front plate, and a clipping hole defined in the top plate; and
an operating member comprising a bottom panel, a top panel, a positioning portion, and a securing piece extending from an undersurface of the bottom panel; the bottom panel attached to the top plate, a space defined between the top panel and the bottom panel; a supporting panel is located between the top panel and the bottom panel, and the supporting panel is configured for strengthening the configuration of the operating member;
wherein the positioning portion is slidably received in the clipping hole; when the positioning portion is positioned in a first end of the clipping hole, the securing piece is disengaged from the front plate; and when the positioning portion is positioned in a second opposite end of the clipping hole, the securing piece is engaged with the front plate; and when the securing piece is engaged in the front plate, the securing piece is substantially parallel to the front plate.

9. The electronic device enclosure of claim 8, wherein the securing piece is substantially perpendicular to the bottom panel.

10. The electronic device enclosure of claim 8, further comprising a decorating plate attached to the front plate, wherein the decorating plate comprises a flange, the top panel comprises a connecting flange, and the flange is attached to the connecting flange when the positioning portion is positioned in the second opposite end of the clipping hole.

11. The electronic device enclosure of claim 10, wherein the top panel further comprises a strengthening structure configured for strengthening the configuration of the top panel.

12. The electronic device enclosure of claim 11, wherein the strengthening structure comprises a plurality of first ribs and a second rib, the second rib traversing the plurality of first ribs.

13. The electronic device enclosure of claim 12, wherein each first rib is arc shaped.

14. The electronic device enclosure of claim 12, wherein the second rib is substantially perpendicular to the plurality of first ribs.

15. The electronic device enclosure of claim 12, wherein the operating member further comprises a side panel substantially parallel to the plurality of first ribs.

* * * * *